(12) United States Patent
Fourney

(10) Patent No.: US 7,537,105 B2
(45) Date of Patent: May 26, 2009

(54) APPARATUS AND METHODS FOR CONTROLLING SPACING OF CONVEYED OBJECTS

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 45 days.

(21) Appl. No.: 11/749,582

(22) Filed: May 16, 2007

(65) Prior Publication Data

US 2007/0209909 A1   Sep. 13, 2007

Related U.S. Application Data

(63) Continuation-in-part of application No. 11/610,737, filed on Dec. 14, 2006, which is a continuation-in-part of application No. 11/203,711, filed on Aug. 15, 2005, now Pat. No. 7,311,192.

(51) Int. Cl.
*B65G 19/26* (2006.01)

(52) U.S. Cl. ........................ 198/732; 198/728

(58) Field of Classification Search ................ 198/717, 198/731, 728, 732, 817
See application file for complete search history.

(56) References Cited

U.S. PATENT DOCUMENTS

| | | | |
|---|---|---|---|
| 2,600,726 A | 6/1952 | Behrens | |
| 4,101,020 A * | 7/1978 | Langen | 198/469.1 |
| 4,565,363 A | 1/1986 | Faltin | |
| 4,682,684 A | 7/1987 | Lothman | |
| 5,165,514 A | 11/1992 | Faulkner | |
| 5,501,318 A * | 3/1996 | Disrud | 198/732 |
| 5,711,412 A * | 1/1998 | Gysin et al. | 198/732 |
| 6,134,865 A * | 10/2000 | Long | 53/540 |
| 6,260,690 B1* | 7/2001 | Batzer | 198/626.5 |
| 6,318,544 B1 | 11/2001 | O'Connor et al. | |
| 6,390,285 B2 | 5/2002 | DeGeus et al. | |
| 7,017,733 B2* | 3/2006 | Pfankuch | 198/731 |
| 2006/0070850 A1 | 4/2006 | Hartness et al. | |
| 2006/0207862 A1 | 9/2006 | Costanzo et al. | |

* cited by examiner

*Primary Examiner*—Douglas A Hess
(74) *Attorney, Agent, or Firm*—James T. Cronvich

(57) ABSTRACT

In one embodiment, apparatus for controlling spacing of objects conveyed by an object conveyor include flights that can be actuated from a retracted state to an extended state in which the flights extend transversely across the object conveyor, the flights limiting travel of the objects to control their relative spacing, wherein the flights actuate with relatively little force such that a retracted flight will not extend once it contacts a directly adjacent object that occupies space into which the retracted flight would normally extend.

22 Claims, 5 Drawing Sheets

APPARATUS AND METHODS FOR CONTROLLING SPACING OF CONVEYED OBJECTS

CROSS-REFERENCE TO RELATED APPLICATIONS

This application is a continuation-in-part of copending U.S. patent application Ser. No. 11/610,737 entitled "Systems And Methods For Providing An Improved Timing Conveyor," filed Dec. 14, 2006, which is a continuation-in-part of U.S. patent application Ser. No. 11/203,711 entitled "Systems and Methods for Providing An Improved Timing Conveyor," filed Aug. 15, 2005, both of which are entirely incorporated herein by reference.

BACKGROUND

It is often desirable to arrange conveyed objects to have a predetermined spacing along the travel direction of a conveyor belt. The spacing enables downstream processing, such as merging objects from multiple conveying lanes into a single lane.

There are several known systems for controlling the spacing of conveyed objects. Some such systems use sensors and selectively actuatable stops that are controlled in response to information detected by the sensors. Unfortunately, these systems are relatively complex and can significantly limit the speed at which the objects are conveyed.

Other known systems use stops that are not sensor controlled. Although less complex than sensor-controlled systems, the stops of these systems are more likely to, at least intermittently, damage the conveyed objects. For instance, a conveyed object can be punctured or deformed when it runs into a partially extended stop or when a stop is forced open against an object that is already present in the conveyance path.

BRIEF DESCRIPTION OF THE DRAWINGS

The disclosed apparatuses and methods can be better understood with reference to the following drawings. The components in the drawings are not necessarily to scale.

DETAILED DESCRIPTION

Described in the following are apparatus and methods that employ flights to control the spacing of objects being transported by a conveyor. In at least some embodiments, the flights are designed to pop-up from a belt in which they are mounted when they are needed to control object spacing. In such cases, the flights may be transitioned from a retracted state in which they are substantially parallel to the plane of the belt to an extended state in which they are substantially perpendicular to the plane of the belt. Given that the flights are not always in the extended state, the chances of a conveyed object running into a flight are reduced. In at least some embodiments, the flights are "low-torque" flights, meaning that they open with relatively little force such that the flights will not open when an object occupies the space into which the flight would normally open, thereby further reducing the likelihood of damage to conveyed objects.

In the following, various embodiments of apparatus and methods are disclosed. Although specific embodiments are presented, those embodiments are mere example implementations of the disclosed apparatus and methods and it is noted that other embodiments are possible. All such embodiments are intended to fall within the scope of this disclosure.

Figure 1:
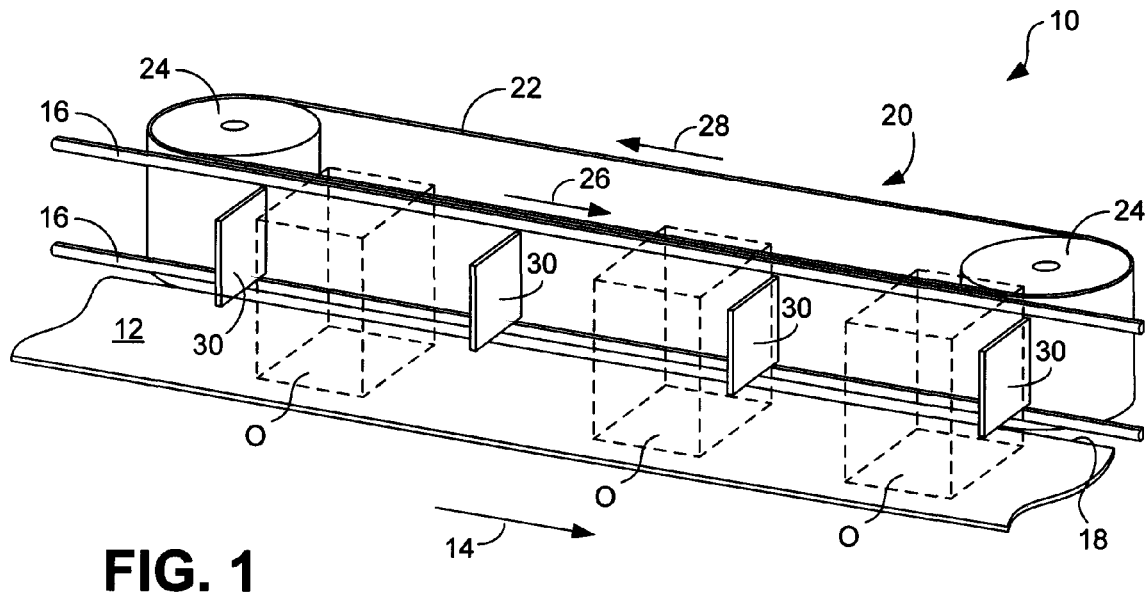
FIG. 1 is a schematic perspective view of a first embodiment of a system for controlling the spacing of conveyed objects.

Turning to the figures, in which like numerals identify corresponding components, FIG. 1 schematically illustrates an embodiment of an object spacing system 10 that can be used to control the spacing of various objects that are being transported. As indicated in FIG. 1, the system 10 comprises a horizontally-oriented conveyor belt 12 that supports and transports objects, O, in a direction of belt travel indicated by arrow 14. The particular construction of the conveyor belt 12 is relatively unimportant. Preferably, however, the material of the surface of the conveyor belt 12 is selected such that the objects, O, can slide across the conveyor belt surface to enable adjustment of their spacing relative to each other. In some embodiments, the conveyor belt 12 comprises a continuous rubber conveyor belt or equivalent. In other embodiments, the belt 12 comprises a chain type belt that comprises a plurality of plastic and/or metal sections or links that are connected together to form a continuous belt.

As is further indicated in FIG. 1, the system 10 can comprise one or more guide rails 16 that are positioned adjacent a lateral edge 18 of the conveyor belt 12. When provided, such rails 16 maintain the lateral positioning of the objects, O, and further prevent tipping of the objects from the conveyor belt 12. Although guide rails 16 are shown provided only along one edge of the conveyor belt 12, similar guide rails can be provided along the opposite edge of the belt, if desired. No such additional guide rails are shown in FIG. 1, however, to avoid obscuring other details of the system 10.

Also positioned adjacent the edge 18 of the conveyor belt 12 is an object spacing control apparatus 20. The object spacing control apparatus 20 generally operates to control the spacing of the objects, O, that are conveyed by the conveyor belt 12. Given that such spacing control may be important in terms of timing for various applications, such as merging multiple conveyor lines into a single conveyor line, the object spacing control apparatus 20 may also be considered to be a timing apparatus.

In the embodiment of FIG. 1, the spacing control apparatus 20 comprises a vertically oriented conveyor that operates a vertically oriented conveyor belt 22. In the context of this disclosure, the term "vertically oriented" means that the surface of the conveyor belt 22, which would normally be used to convey objects if the conveyor were horizontally oriented like conveyor belt 12, is vertical. More particularly, the outer surface of the conveyor belt 22 may be said to substantially lie in a vertical plane. Because of its vertical orientation, the conveyor, which from this point will be identified by reference numeral 20 in relation to FIG. 1, is generally orthogonal relative to the conveyor belt 12 and, therefore, the surface of the conveyor belt 22 is displaced approximately 90 degrees from the surface of the conveyor belt 12.

With further reference to FIG. 1, the conveyor belt 22 is driven and, at least partially, supported by sprockets 24. As indicated in the figure, the sprockets 24 drive the conveyor belt 22 in directions indicated by arrows 26 and 28, such that a portion of the conveyor belt adjacent the objects, O, moves in the same direction as the conveyor belt 12 and, therefore, the same direction as the objects. In at least some embodiments, however, the conveyor belt 22 is operated at a slower linear speed than the conveyor belt 12 to enable the spacing control functionality.

As is further indicated in FIG. 1, the conveyor belt 22 comprises multiple flights 30 that serve as "stops" that limit travel of the objects, O, to control their relative spacing. In at least some embodiments, the flights 30 are pop-up flights, meaning that they can be transitioned from a retracted state in which they are substantially parallel to or flush with the plane of the conveyor belt 22 to an extended state in which they are substantially perpendicular to the plane of the conveyor belt. Each of the flights 30 illustrated in FIG. 1 is in the extended state. Therefore, each of the flights 30 positioned adjacent the conveyor belt 12 extends transversely across the width of the conveyor belt 12, perpendicular to the direction of belt travel 14. As indicated in FIG. 1, the flights 30 need not extend across the entire width of the conveyor belt 12. Instead, the flights 30 may extend across only a portion of that width, for example approximately half the width of the belt 12. In the embodiment shown in FIG. 1, the flights 30 extend over the conveyor belt 12 between the support rails 16. More generally, the flights 30 are oriented and configured such that they avoid any potential obstructions, including the rails.

As described in greater detail below, the conveyor 20 operates to control the spacing of the objects, O, being transported by the conveyor belt 12. In particular, objects having random spacing along the length of the conveyor belt 12 can be "stopped" by the flights 30, which travel at a speed that is less than the conveyor belt speed and therefore less than the speed of the objects. As each object, O, abuts against a flight 30, each object is positioned on the conveyor belt 12 so as to have a relative spacing that equals the relative spacing of the flights.

Figure 2:
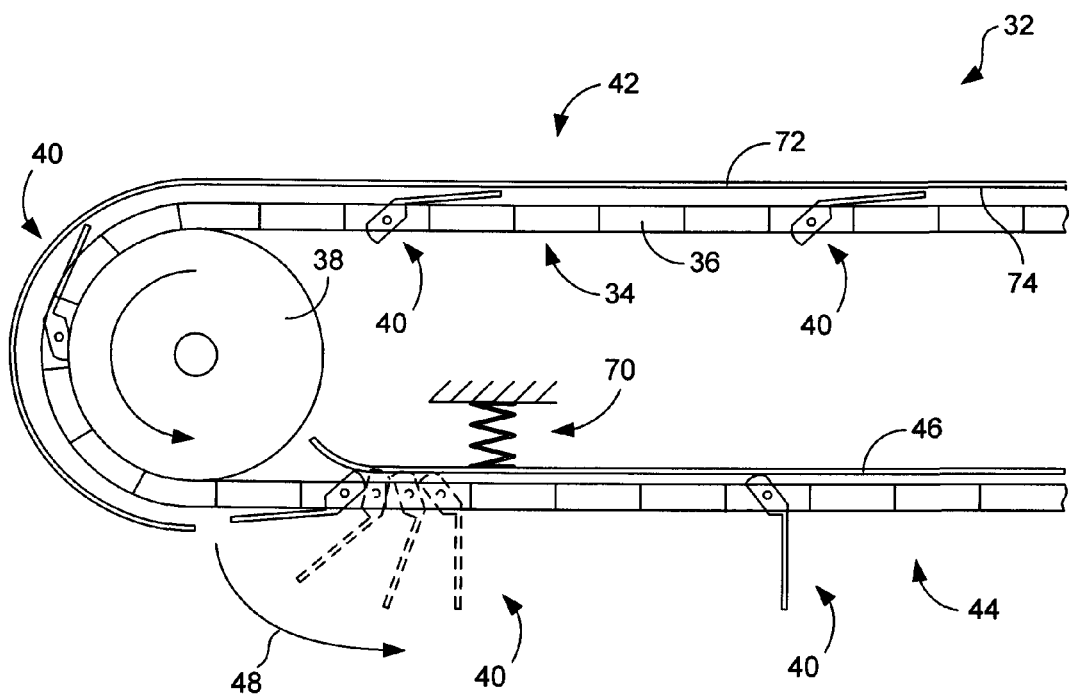
FIG. 2 is a top view of an embodiment of an object spacing control apparatus shown in FIG. 1.

FIG. 2 illustrates a spacing control apparatus 32 that reflects a possible configuration for the spacing control apparatus 20 of FIG. 1. As indicated in FIG. 2, the apparatus 32 comprises a conveyor belt 34. In this embodiment, the conveyor belt 34 is a chain type conveyor belt that is composed of a plurality of sections or links 36 that are connected together to form a continuous belt. The conveyor belt 34 is driven by sprockets 38 (only one sprocket shown in FIG. 2). Provided at predetermined positions along the length of the conveyor belt 34, for example within predetermined links 36, are pop-up flights 40. As shown in FIG. 2, the pop-up flights 40 are oriented in a retracted state along a back side 42 of the apparatus 32 and in an extended state along a front side 44 of the apparatus that faces the conveyor belt that transports objects whose spacing is to be controlled. Positioned within the apparatus 32 between the back and front sides 42 and 44 is a flight actuation mechanism 46 that is used to actuate the flights 40 to transition them from the retracted state to the extended state. In the embodiment of FIG. 2, the actuation mechanism 46 comprises a plate member that provides a contact surface that the flights 40 contact when they approach the front side 44 of the apparatus 32. The sequence of flight actuation is illustrated in FIG. 2 for a flight 40 that is positioned at the left end of the front side 44 of the apparatus 32. As indicated there, the flight 40 initially begins in the retracted state. Once the flight 40 makes contact with the actuation mechanism 46, however, the flight is rotated in the direction indicated by arrow 48 due to the frictional forces between the flight and the actuation mechanism. The flight 40 continues to rotate in that manner until the flight is placed in the extended state, in which a working surface of the flight is generally perpendicular to the outer surface of the conveyor belt 34 and the direction of object travel. Notably, the flight 40 and/or the conveyor belt 34 are configured so as to limit further rotation of the flight. Therefore, in at least some embodiments, the flight 40 cannot be rotated to a position in which the working surface is placed beyond the perpendicular orientation.

Figure 3:
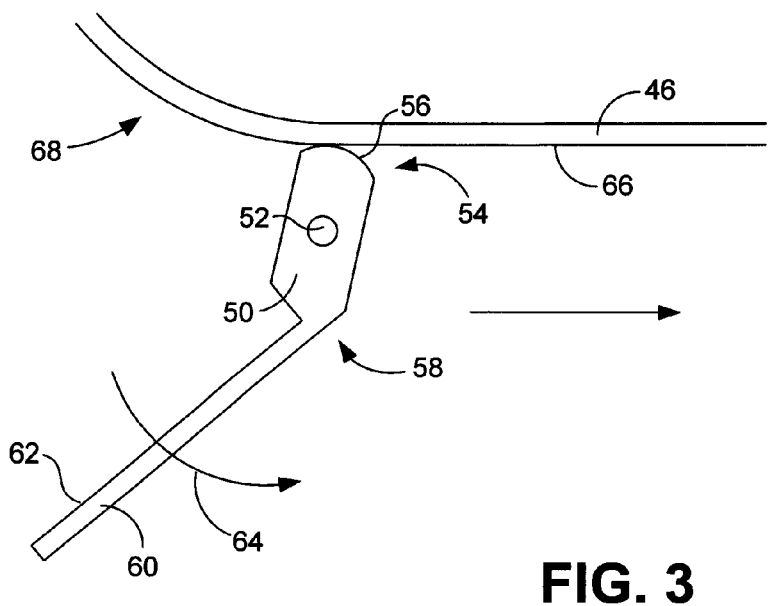
FIG. 3 is a detail view illustrating actuation of a flight of the apparatus of FIG. 2.

FIG. 3 illustrates an example configuration of the flights 40 and further illustrates flight actuation. As indicated in FIG. 3, the flight 40 can comprise a body 50 having a generally rectangular cross-section that comprises an opening 52 that extends across a width direction of the flight and defines an axis of pivotal rotation for the flight. The opening 52 is adapted to receive one or more shafts or rods (not shown) that are used to mount the flight 40 to the conveyor belt 34, for example, to one or more of the links 36 of the conveyor belt. A first end 54 of the body 50 comprises a cam surface 56 adapted to interface with the actuation mechanism 46. In some embodiments, the cam surface 56 is a curved surface having a constant radius of curvature. In other embodiments, the cam surface 56 comprises a curved surface having a varying radius of curvature. In still other embodiments, the cam surface 56 can comprise one or more flat surfaces. The body 50 further comprises a second end 58 from which extends a generally planar stop member 60. The stop member 60 typically comprises a generally flat working surface 62 against which objects abut when the flight 40 is used to limit the travel of the objects. As indicated in FIG. 3, the stop member 60 can extend from the body 50 at an angle, for example, approximately 45 degrees.

In some embodiments, the flight 40 is unitarily constructed from a single piece of material. In other embodiments, the flight 40 comprises separate parts, for example, the body 50 and the stop member 60, that are connected together to form an integral component. In either case, the material of the cam surface 56 is a relatively low-friction material such that the flight 40 is rotated (in the direction or arrow 64) with relatively little force. For the purposes of this disclosure, the term "relatively little force" means a force that is sufficient to open the flight 40 only when an object is not present in the space in which the flight would normally open. Therefore, the flight will not open when it encounters a directly adjacent object, thereby avoiding damaging the object. That result can be facilitated by also selecting a relatively low-friction material for the contact surface 66 of the actuation mechanism 46. In some embodiments, the frictional force between the cam surface 56 and the contact surface 66 is just large enough to overcome the frictional and/or gravitational forces that maintain the flights 40 in their retracted state. By way of example, one or both of the cam surface 56 and the contact surface 66 comprise a metal plastic material. In some embodiments, one or both of the cam surface 56 and the contact surface 66 can comprise UHMW, acetal, Derlin® resin, or other slick plastics.

As is further illustrated in FIG. 3, the actuation mechanism 46 can comprise a transition zone 68 that facilitates gradual interfacing between the flight 40 and the actuation mechanism. In embodiments in which the actuation mechanism 46 comprises a plate member, the transition zone 68 can comprise a rounded or angled section of the plate member.

Returning to FIG. 2, the actuation mechanism 46 is positioned and/or mounted within the apparatus 32 such that only light contact is made between the flights 40 and the actuation mechanism to further ensure that the flights actuate with relatively little force. As indicated in FIG. 2, the apparatus 32 can include one or more springs 70 that enable the actuation mechanism 46 to "give" under forces transmitted by the flights 40. In other embodiments, no springs are provided but the actuation mechanism 46 itself has spring-like qualities that enable it to give under forces transmitted by the flights 40. For example, in embodiments in which the actuation mechanism 46 comprises a plate member, the plate member can be relatively thin and constructed of a pliable material, such as metal or plastic, that will flex inward to accommodate the flights 40.

As is further indicated in FIG. 2, the spacing control apparatus 32 further can comprise a flight retraction mechanism 72. In the embodiment of FIG. 2, the retraction mechanism 72 comprises a rail that follows at least a portion of the apparatus 32 and that comprises an inner surface 74 that forces the flights 40 to return to the retracted state and further prevents the flights from transitioning to the extended state. Because of the retraction mechanism 72, the flights 40 remain in the retracted state until they reach the front side 44 of the apparatus 32, thereby avoiding situations in which an approaching object can collide with a partially extended flight. As indicated in FIG. 2, the retraction mechanism 72 can be positioned at an upstream end of the apparatus 32 to ensure such collision is avoided.

Figure 4:
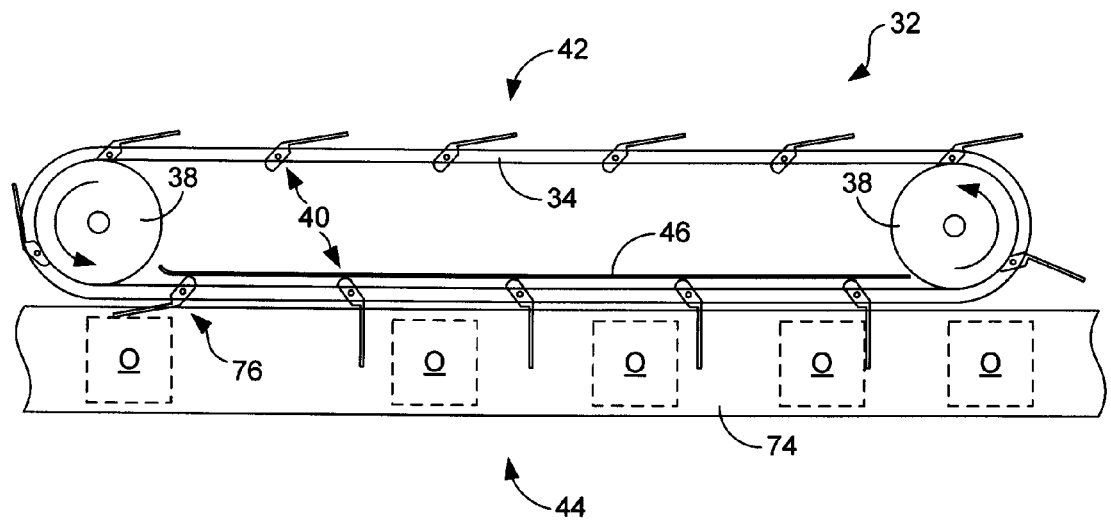
FIG. 4 is a schematic top view of the apparatus of FIG. 2, illustrating use of the apparatus in controlling the spacing of conveyed objects.
Figure 5:
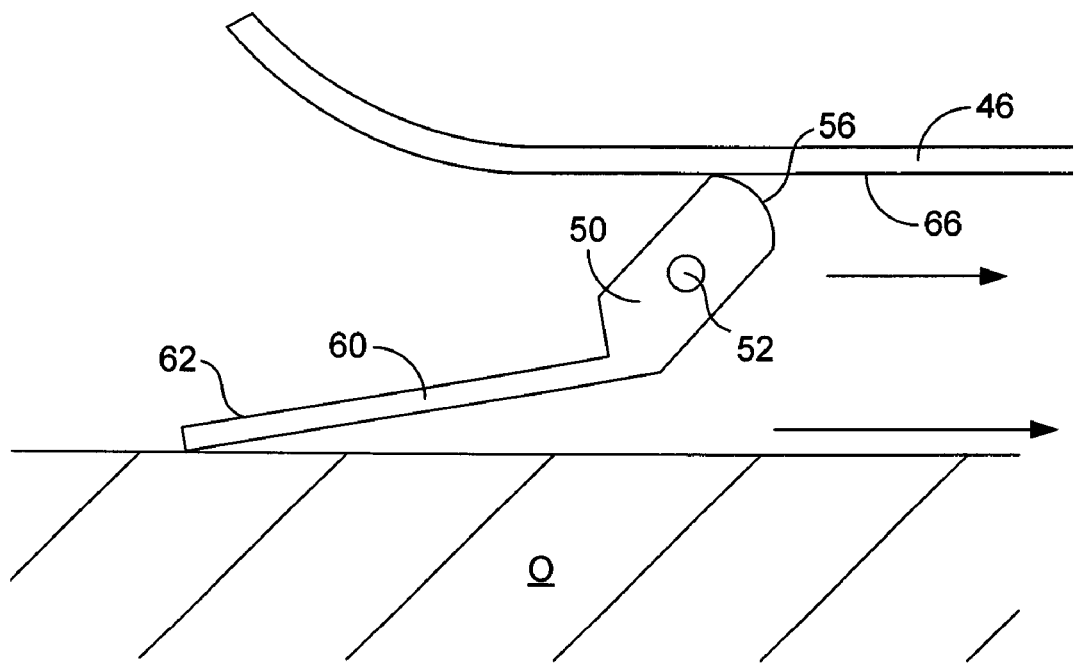
FIG. 5 is a detail view illustrating limited actuation of a flight of the apparatus of FIG. 2 in the presence of a conveyed object.

Situations in which a flight extends despite the presence of an object can also be avoided. FIGS. 4 and 5 illustrate this principle. Beginning with FIG. 4, it can be seen that the flights 40 of the spacing control apparatus 32 are actuated to limit the travel of objects, O, supported by a relatively fast moving conveyor belt 74. By so limiting the travel of the objects, O, the objects are spaced apart from each other the same distance the flights 40 are spaced apart from each other. However, actuation of the flights 40 will not occur when an object, O, is directly adjacent the flight. This functionality is illustrated for the leftmost object, O, shown in FIG. 4. As indicated in that figure, the directly adjacent flight 76 does not fully open due to the presence of the object, O. Turning to FIG. 5, which is a detail view of the interaction between the flight 76 and the adjacent object, O, it is noted that the flight does not open despite having made contact with the actuation mechanism 46. Instead, the cam surface 56 of the flight 76 merely slides along the contact surface 66 of the actuation mechanism 46 due at least in part to the relatively low-friction materials used for one or both of the cam surface and the contact surface. Preventing flights from opening can further be facilitated by any "give" that is built into the actuation mechanism 46 or the components used to mount the actuation mechanism within the apparatus 32. Given that the flight 76 will not open in the presence of the object, O, the object is not damaged. Referring again to FIG. 4, the object, O, will eventually pass over the flight 76 because the object travels at a greater speed than the flight. Once the object, O, passes, the flight 76 will open to the extended state and will be prepared to limit the travel of the next object conveyed by the belt 74.

Figure 6:
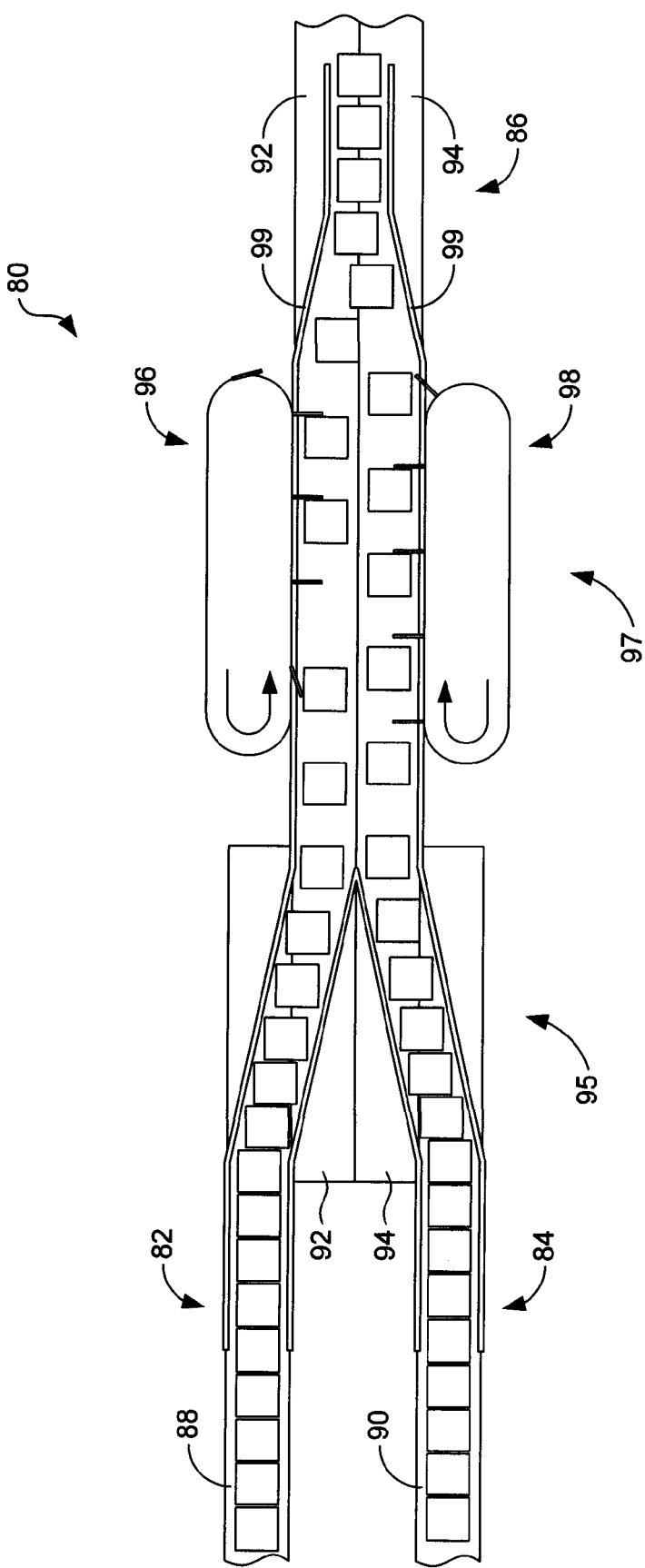
FIG. 6 is a schematic top view of a conveying system that implements object spacing control apparatuses.

FIG. 6 illustrates an example application for spacing control apparatus of the type described in the foregoing. More particularly, FIG. 6 illustrates a conveyor system 80 that consolidates or merges two conveyor lines 82 and 84 into a single conveyor line 86. In such a merge process, the objects of each of the lines 82, 84 are first spaced a predetermined distance apart along the direction of travel and staggered relative to each other. Flow for objects conveyed by the system 80 will be described from upstream (left) to downstream (right) in the following.

The objects (represented by squares) are transported along lines 82, 84 by conveyor belts 88 and 90, respectively, and are then gradually transitioned onto conveyor belts 92 and 94, respectively, in a transition zone 95. The conveyor belts 92,94 travel at a substantially faster speed than conveyor belts 88, 90. By way of example, conveyor belts 92, 94 travel 2.5 times as fast as conveyor belts 88, 90.

After leaving the transition zone 95, the objects enter a spacing control zone 97 in which two spacing control apparatus 96 and 98 are provided, one for each line 82, 84 of objects. The apparatus 96, 98 limit travel of the objects to control their relative spacing in the manner described above. Notably, the flights of the apparatus 96, 98 are staggered relative to each other such that the objects of each line 82, 84 will likewise be staggered relative to each other. Once the objects have been spaced and staggered, the objects from each line 82, 84 are combined into line 86 through the use of guide rails 99 that centrally displace the objects.

Figure 7:
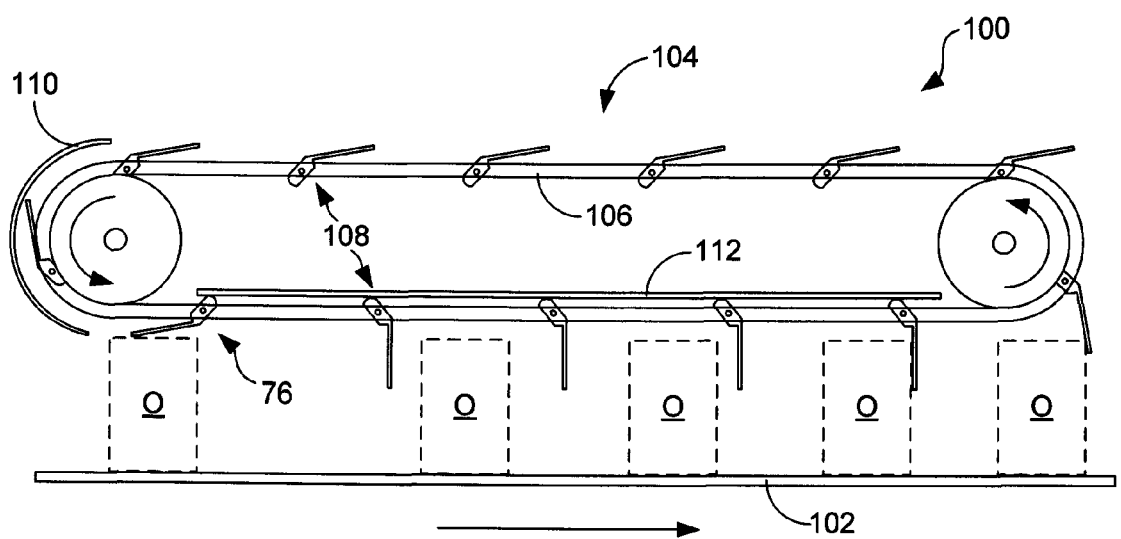
FIG. 7 is a schematic side view of a second embodiment of a system for controlling the spacing of conveyed objects.
Figure 8:
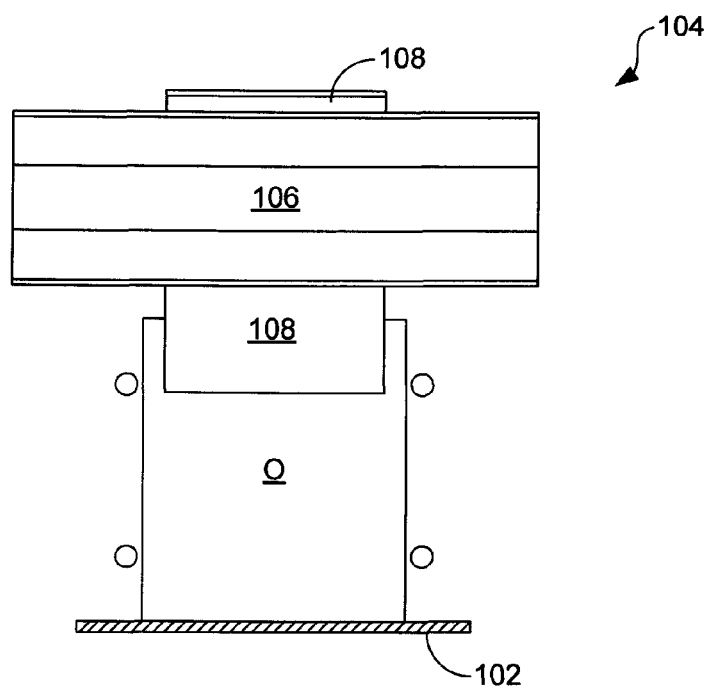
FIG. 8 is a schematic end view of the system of FIG. 7.

FIGS. 7 and 8 illustrate a second embodiment of a system 100 for controlling the spacing of conveyed objects. The system 100 is similar in some ways to the system 10 shown in FIGS. 2 and 4. For instance, the system 100 comprises a conveyor belt 102 that conveys objects, O, whose spacing is to be controlled, and an object spacing control apparatus 104 that is similar in design and function to the object spacing control apparatus 32. The apparatus 104 therefore comprises its own conveyor belt 106 that supports multiple flights 108 that can be transitioned from a retracted state to an extended state. Furthermore, the apparatus 104 comprises a retraction mechanism 110 that at least maintains the flights 108 in the retracted state until it is desired that they extend. In the system 100, however, the apparatus 104 is horizontally oriented and positioned above the conveyor belt 102 such that the flights 108 extend downward to interface with top portions of the objects, O, to limit their travel.

In at least some embodiments, the flights 108 are at least partially actuated by the force of gravity. That is, when the flights 108 clear the retraction mechanism 110, they are free to flip downward to a position in which they are substantially perpendicular to both the conveyor belt 106 and the conveyor belt 102. In such a case, the force with which the flights 108 open is proportional to the weight of the flights and, assuming relatively lightweight flights, that force is relatively soft. Therefore, when an object, O, is positioned directly below a flight 108 that has not yet fully extended, the flight will not extend beyond the point at which contact is made with the object and further will not exert a degree of force on the object that is sufficient to damage it. Once the object, O, has cleared the flight 108, however, the flight will be free to drop down to the extended state.

As indicated in FIG. 7, the apparatus 104 optionally may include a flight actuation mechanism 112 in cases in which the force of gravity is not great enough to consistently open the flights 108.

The invention claimed is:

1. Apparatus for controlling spacing of objects conveyed by an object conveyor traveling at a first linear speed, the apparatus comprising:
   flights that can be actuated from a retracted state to an extended state in which the flights extend transversely across the object conveyor and travel at a second linear speed slower than the first linear speed, the flights limiting travel of the objects to control their relative spacing, wherein the flights actuate with relatively little force such that a retracted flight will not extend once it contacts a directly adjacent object that occupies space into which the retracted flight would normally extend.

2. The apparatus of claim 1, further comprising a conveyor belt to which the flights are mounted and wherein the flights are substantially parallel to the conveyor belt in the retracted state and substantially perpendicular to the conveyor belt in the extended state.

3. The apparatus of claim 2, wherein the conveyor belt is vertically oriented such that an outer surface of the conveyor belt lies within a vertical plane.

4. The apparatus of claim 3, wherein the conveyor belt is positioned adjacent a lateral edge of the object conveyor.

5. The apparatus of claim 2, further comprising an actuation mechanism adapted to actuate the flights when they are positioned adjacent the object conveyor.

6. The apparatus of claim 5, wherein the actuation mechanism comprises a plate member that the flights contact during actuation.

7. The apparatus of claim 2, further comprising a retraction mechanism that at least maintains the flights in the retracted state.

8. The apparatus of claim 7, wherein the retraction mechanism also retracts the flights.

9. The apparatus of claim 8, wherein the retraction mechanism comprises a rail that forces the flights into the retracted state.

10. The apparatus of claim 2, wherein the conveyor belt is horizontally oriented and positioned above the object conveyor such that the flights drop downward when actuated and interface with top portions of the objects to limit their travel.

11. The apparatus of claim 10, wherein the flights are actuated at least in part by gravity.

12. The apparatus of claim 1, wherein the flights comprise a cam surface used to actuate the flight and a stop member used to limit travel of the objects.

13. The apparatus of claim 12, wherein the cam surface comprises a curved surface that interfaces with a contact surface of an actuation mechanism and wherein the stop member comprises a substantially flat working surface that interfaces with the objects.

14. Apparatus for controlling spacing of objects conveyed by an object conveyor traveling at a first linear speed, the apparatus comprising:
 a belt traveling at a second linear speed slower than the first linear speed and including a plurality of flights that can be actuated from a retracted state in which the flights are substantially parallel to the belt to an extended state in which the flights are substantially perpendicular to the belt, the flights being adapted to limit travel of the objects to control their relative spacing along a length direction of the object conveyor;
 an actuation mechanism adapted to actuate the flights when they approach the object conveyor to transition the flights from the retracted state to the extended state, the actuation mechanism being adapted to actuate the flights with relatively little force such that a retracted flight will not extend once it contacts a directly adjacent object that occupies space into which the retracted flight would normally extend; and
 a retraction mechanism at least adapted to maintain the flights in the retracted state until the flights are intended to be actuated and placed in the extended state.

15. The apparatus of claim 14, wherein the belt is vertically oriented such that an outer surface of the conveyor belt lies within a vertical plane.

16. The apparatus of claim 14, wherein the actuation mechanism comprises a plate member that the flights contact during actuation.

17. The apparatus of claim 16, wherein at least one of the flights comprises a cam surface that interfaces with a surface of the plate member and where friction between the cam surface and the plate member surface pivotally rotates the flight into the extended state.

18. The apparatus of claim 14, wherein the retraction mechanism is also adapted to retract the flights.

19. The apparatus of claim 18, wherein the retraction mechanism comprises a rail that forces the flights into the retracted state.

20. The apparatus of claim 14, wherein the conveyor belt is horizontally oriented and positioned above the object conveyor such that the flights drop downward when actuated and interface with top portions of the objects to limit their travel.

21. The apparatus of claim 19, wherein the flights are actuated at least in part by gravity.

22. A method for controlling spacing of objects provided on an object conveyor that conveys the objects at a first linear speed, the method comprising:
 operating a belt adjacent the object conveyor at a second linear speed that is slower than the first linear speed, the belt comprising a plurality of flights adapted to limit travel of the objects;
 extending individual flights when they are positioned alongside the object conveyor such that they transition from a retracted state in which the flights are substantially parallel to the belt to an extended state in which the flights are substantially perpendicular to the belt;
 limiting travel of individual objects conveyed by the object conveyor with the extended flights;
 not extending a retracted flight that contacts a directly adjacent object that occupies space into which the retracted flight would normally extend; and
 retracting the extended flights after they have been used to limit the travel of an object.

* * * * *